(12) United States Patent
Deile

(10) Patent No.: US 6,879,616 B2
(45) Date of Patent: Apr. 12, 2005

(54) DIFFUSION-COOLED LASER SYSTEM

(75) Inventor: Jochen Deile, West Hartford, CT (US)

(73) Assignee: Trumpf, Inc., Farmington, CT (US)

( * ) Notice: Subject to any disclaimer, the term of this patent is extended or adjusted under 35 U.S.C. 154(b) by 0 days.

(21) Appl. No.: 10/350,366

(22) Filed: Jan. 24, 2003

(65) Prior Publication Data

US 2004/0146081 A1 Jul. 29, 2004

(51) Int. Cl.[7] .............................................. H01S 3/223
(52) U.S. Cl. ...................................................... 372/55
(58) Field of Search ............................ 372/55–58, 101, 372/61, 34, 22, 87

(56) References Cited

U.S. PATENT DOCUMENTS

| | | | | | |
|---|---|---|---|---|---|
| 4,359,777 A | * | 11/1982 | Fox et al. | ...................... | 372/61 |
| 4,500,996 A | * | 2/1985 | Sasnett et al. | ................ | 372/19 |
| 5,131,003 A | * | 7/1992 | Mefferd | ........................ | 372/65 |
| 5,140,606 A | * | 8/1992 | Yarborough et al. | .......... | 372/64 |
| 5,164,952 A | * | 11/1992 | Guenther | ..................... | 372/61 |
| 5,197,079 A | * | 3/1993 | Krueger et al. | ............... | 372/87 |
| 5,220,577 A | * | 6/1993 | Opower | ........................ | 372/92 |

(Continued)

FOREIGN PATENT DOCUMENTS

| | | |
|---|---|---|
| DE | 39 12 568 | 10/1990 |
| EP | 0 052 714 | 3/1988 |
| EP | 0 776 073 | 10/2002 |
| GB | 2 117 558 | 10/1983 |
| JP | 58-015286 | 1/1983 |
| JP | 06-152011 | 5/1994 |
| JP | 08-083945 | 3/1996 |

OTHER PUBLICATIONS

Saetchnikov, V.A., "Enhancement of $CO_2$ Waveguide and Slab Laser Operation with Statistically Homogeneous and Periodic Structures Created at Electrode Surface," Optical Fiber and Planar Waveguide Technology, *Proceedings of SPIE*, vol. 4579, APOC 2001, Beijing, China, pp. 301–309, no month or day.

Saetchnikov, V.A., et al., "Influence of the Light Field Scattering by Corrugated Electrode Surface on the Waveguide Laser Operation," Optical Fiber and Planar Waveguide Technology II, *Proceedings of SPIE*, vol. 4904, APOC 2002, Beijing, China, pp. 279–288, no month or day.

*Primary Examiner*—Wilson Lee
*Assistant Examiner*—Hung Tran Vy
(74) *Attorney, Agent, or Firm*—Fish & Richardson P.C.

(57) ABSTRACT

There is provided an improved gas laser system comprising therein (a) a pair of opposed electrodes comprising an inner and an outer electrode, defining a discharge volume with an inter-electrode gap, each of the pairs of opposed electrodes having a series of saw teeth in a pattern, the inter-electrode gap having first and second opposed ends, the inter-electrode gap having a first dimension at the first end, a second dimension at the second end, and a third dimension at a point between the first end and the second end, the third dimension being less than the first and second dimensions; and (b) a pair of mirrors, each of the mirrors mounted adjacent to one of the ends for directing light generated in the inter-electrode gap through the discharge volume.

9 Claims, 2 Drawing Sheets

U.S. PATENT DOCUMENTS

| | | | | |
|---|---|---|---|---|
| 5,224,117 A | * | 6/1993 | Kruger et al. | 372/82 |
| 5,231,644 A | * | 7/1993 | Krueger et al. | 372/17 |
| 5,245,625 A | * | 9/1993 | Guenther | 372/82 |
| 5,255,283 A | * | 10/1993 | Belanger et al. | 372/99 |
| 5,271,029 A | * | 12/1993 | Seiffarth et al. | 372/69 |
| 5,335,242 A | * | 8/1994 | Hobart et al. | 372/95 |
| 5,353,297 A | * | 10/1994 | Koop et al. | 372/64 |
| 5,392,309 A | * | 2/1995 | Nishimae et al. | 372/95 |
| 5,412,681 A | * | 5/1995 | Eisel et al. | 372/64 |
| 5,430,753 A | * | 7/1995 | Welsch et al. | 372/87 |
| 5,600,668 A | * | 2/1997 | Erichsen et al. | 372/87 |
| 5,661,746 A | * | 8/1997 | Sukhman et al. | 372/83 |
| 5,684,822 A | * | 11/1997 | Partlo | 372/95 |
| 5,748,663 A | * | 5/1998 | Chenausky | 372/64 |
| 5,754,575 A | * | 5/1998 | Sukhman et al. | 372/36 |
| 5,822,354 A | * | 10/1998 | Vitruk | 372/92 |
| 5,881,087 A | * | 3/1999 | Sukhman et al. | 372/61 |
| 5,892,782 A | * | 4/1999 | Vitruk et al. | 372/19 |
| 5,894,493 A | * | 4/1999 | Sukhman et al. | 372/83 |
| 5,953,360 A | * | 9/1999 | Vitruk et al. | 372/87 |
| 5,982,803 A | | 11/1999 | Sukhman et al. | 372/87 |
| 6,198,759 B1 | * | 3/2001 | Broderick et al. | 372/39 |
| 6,285,703 B1 | * | 9/2001 | Schluter | 372/95 |
| 6,442,187 B1 | | 8/2002 | Dutov et al. | 372/101 |
| 6,560,263 B1 | * | 5/2003 | Morton et al. | 372/87 |
| 2001/0033588 A1 | | 10/2001 | Broderick et al. | 372/39 |

* cited by examiner

025# DIFFUSION-COOLED LASER SYSTEM

FIELD OF THE INVENTION

This invention relates generally to laser systems and more particularly to an improved gas laser.

BACKGROUND OF THE INVENTION

Various laser systems are known in the art. For example, Schlüter, U.S. Pat. No. 6,285,703, entitled "Laser Resonator," discloses a particular annular $CO_2$ laser with a coaxial discharge structure. Fox, et al., U.S. Pat. No. 4,359,777, discloses that to obtain a high efficiency gas laser which utilizes transverse electrical excitation of a laser gas medium, the excitation energy should be applied to only the optical mode volume of the laser mode.

Broderick et al., U.S. Pat. No. 6,198,759, describes a narrow gap laser operated in the free space mode. Thus, the Broderick, et al. patent notes that the electrodes form a gap large enough to avoid the waveguide mode and have a curved surface so that inner electrode gap decreases from each end towards the center of the laser cavity so as to form the shape of the fundamental transverse mode of the naturally occurring laser beam for the set of mirrors to be used. However, such a device can still support spurious transverse reflections that can reduce the overall efficiency and beam quality.

SUMMARY OF THE INVENTION

The present invention provides a gas laser that includes: (a) a pair of opposed electrodes comprising an inner and an outer electrode, defining a discharge volume with an inter-electrode gap, each of the pairs of opposed electrodes having a series of saw teeth in a pattern, the inter-electrode gap having first and second opposed ends, the inter-electrode gap having a first dimension at the first end, a second dimension at the second end, and a third dimension at a point between the first end and the second end, the third dimension being less than the first and second dimensions; and (b) a pair of mirrors, each of the mirrors mounted adjacent to one of the ends for directing light generated in the inter-electrode gap through the discharge volume.

In accordance with a second aspect of the present invention, there is provided in a gas laser, (a) a cylindrical inner electrode having an outer threaded surface; (b) a hollow, cylindrical outer electrode having an inner threaded surface spaced apart from and facing the outer threaded surface of the inner electrode, thereby defining a discharge volume between the inner electrode and the outer electrode with an annular, inter-electrode gap having a first end and a second end, a first radial dimension at the first end, a second radial dimension at the second end, and a third radial dimension between the first end and second end that is less than the first and second radial dimensions; and (c) a pair of mirrors, each of the mirrors mounted adjacent to one of the ends for directing light generated in the inter-electrode gap through the discharge volume.

In accordance with a third aspect of the present invention, the pitch of the threaded surfaces is different. The pitch could also be the same on both electrodes or be a combination of left- and right-handed threads.

In accordance with a fourth aspect of the present invention, the ratio of one pitch to the other is not an integer.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

These and other aspects, features, objects, and advantages of the present invention will become better understood with regard to the following description, appended claims, and accompanying drawings.

DETAILED DESCRIPTION

In the following detailed description of the embodiments, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense. The same reference numbers identify identical components, which appear in multiple figures.

The present invention is an improvement in the electrode structure of a resonator, to optimize diffusion cooling while maintaining beam quality.

Figure 1:
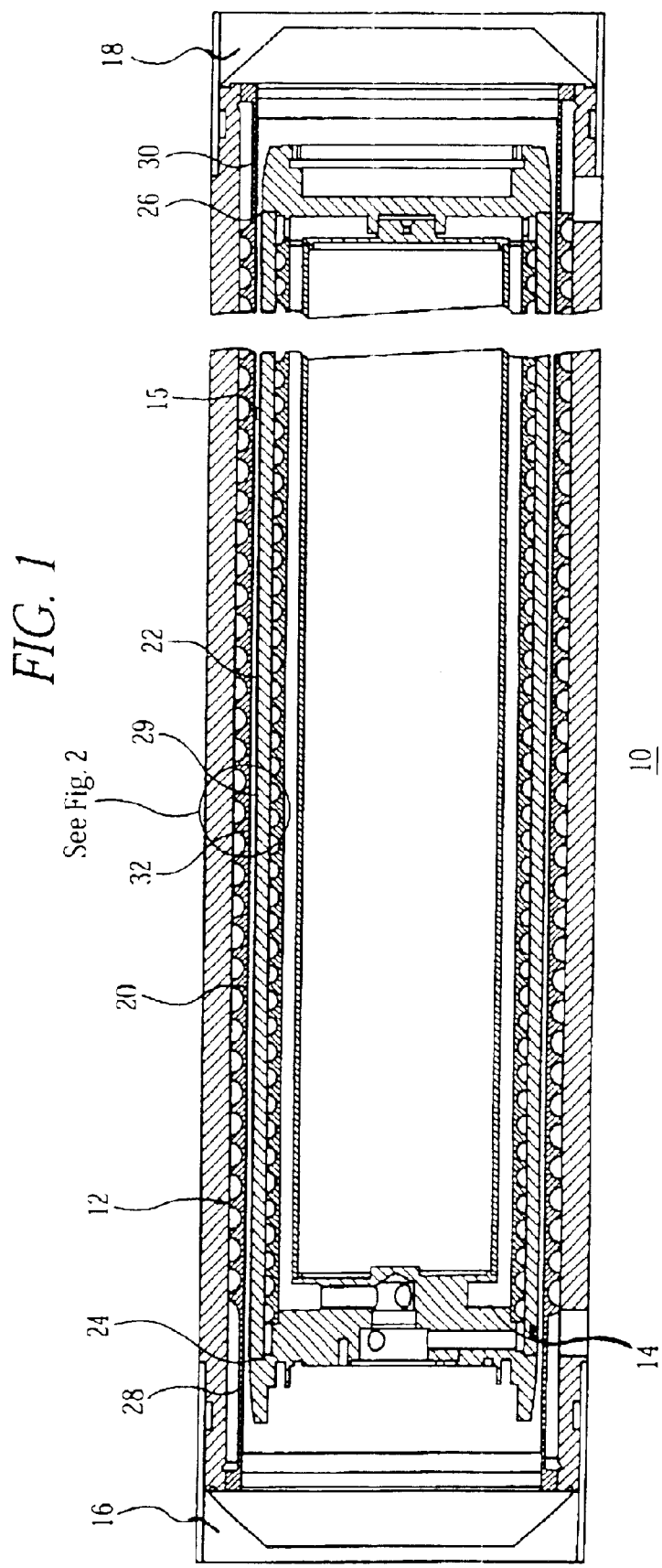
FIG. 1 is a cross-sectional view of a diffusion-cooled laser system.

FIG. 1 depicts a portion of an annular gas discharge laser structure 10 showing the aspects that are relevant to the present invention and sufficient additional details to understand their interconnection. While the following sections describe the present invention in terms of annular gas laser systems, the present invention is also operable in other types of laser systems such as, for example, slab laser systems, such as the system described in Broderick et al., U.S. Pat. No. 6,198,759.

As shown in FIG. 1, the laser structure 10 is constructed from several major components. A first component is a cylindrical shaped outer electrode assembly 12 while a second component is a cylindrical shaped inner electrode assembly 14. The inner electrode assembly 14 is mounted inside the outer electrode assembly 12 forming an annular inter-electrode gap 15 between a cylindrical electrode surface 20 of the outer electrode assembly 12 and a cylindrical electrode surface 22 of the inner electrode assembly 14. The laser structure also includes first and second reflector assemblies 16 and 18. The structure and operation of the first and second reflectors 16 and 18 are known in this field (see, e.g., Schlüter, U.S. Pat. No. 6,285,703).

In operation, a radio frequency excites carbon dioxide mixed with known gases in the inter-electrode gap 15 to produce a population inversion. Light emitted from the gas reflects longitudinally through the inter-electrode gap back and forth between the first and second reflector assemblies 16 and 18. As shown in the Schlüter patent, there is an exit port (not shown) where light is extracted from the laser structure 10.

The electrode surfaces 20 and 22 each have a complex longitudinal shape, which cannot be seen in FIG. 1 due to the smallness of detail vis-à-vis the overall dimensions of the laser structure 10. Each of the surfaces depart from a cylindrical shape with the diameter of the electrode surface 22 of the inner electrode surface 14 being approximately 148.5 millimeters at the ends 24 and 26 thereof, and varies to a dimension of approximately 149 millimeters at the center thereof 29. In a like manner, the electrode surface 20 of the outer electrode assembly 12 varies from a dimension of approximately 161.5 millimeters at the ends 28 and 30 thereof and varies to a dimension of approximately 161 millimeters at the center 32 thereof. Thus, the inter-electrode gap 15 is about 6.5 millimeters at the ends thereof and about 6 millimeters at the center. Hence, each surface 20 and 22 deviates from a right symmetrical cylinder by about 0.25 millimeters from their ends to their center. Depending on the mirror structure, the inter-electrode gap 15 may not be longitudinally symmetrical so that the dimensions at the ends 24 and 26 would be different from each other, or the beam waist may not be formed in the middle/center of the electrodes in regards to their longitudinal dimension.

Figure 2:
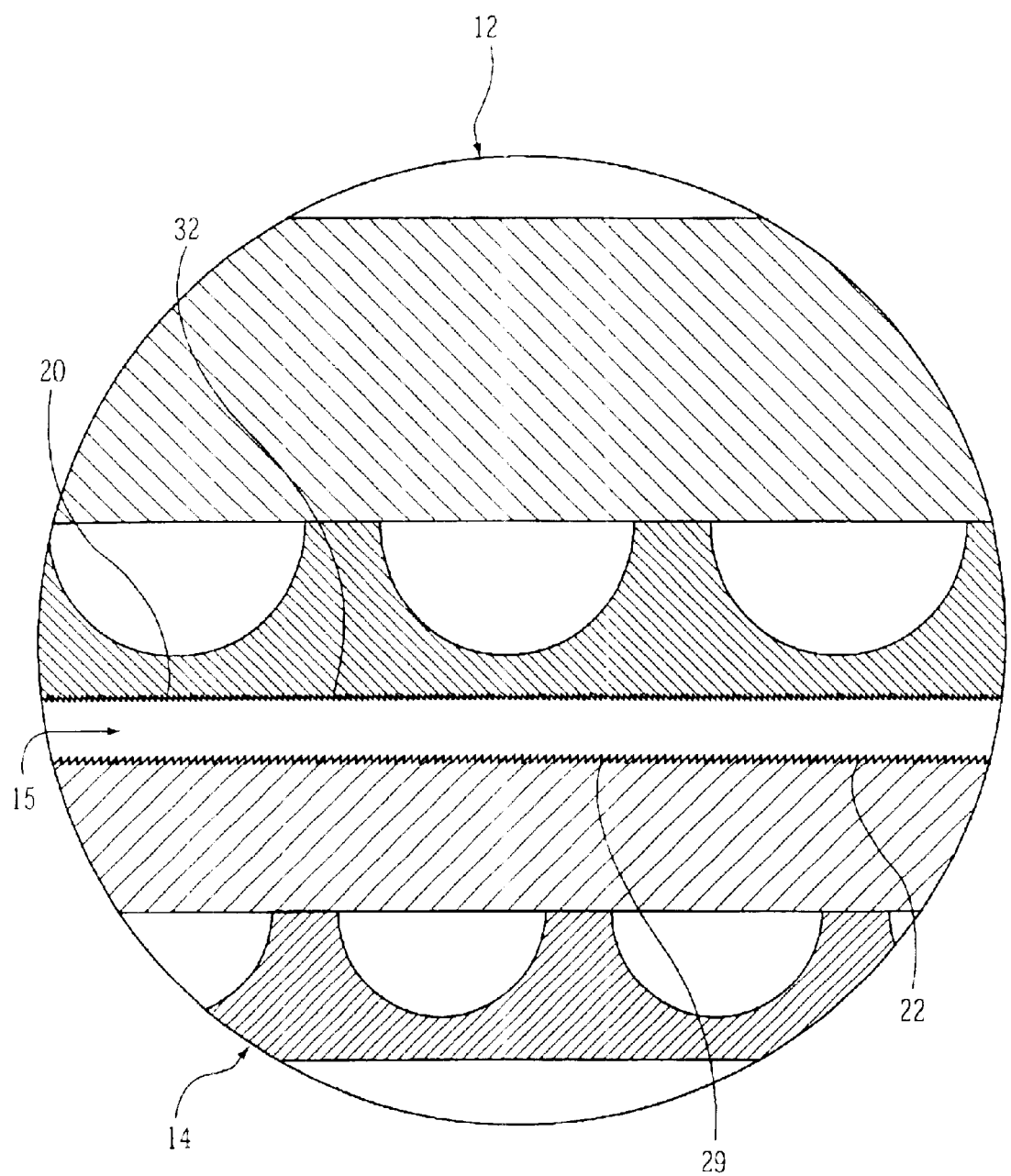
FIG. 2 is an enlarged, detailed view of the circle shown in FIG. 1.

FIG. 2 depicts the detail surrounding the centers 29 and 32 of the inner and outer electrode assemblies 14 and 12. As shown in FIG. 2, superimposed upon each electrode surface 20 and 22 is a saw tooth shaped pattern. The saw tooth pattern on the surface 22 is formed by threading the cylindrical surface thereof while the saw tooth pattern on the surface 20 is formed by threading the inner surface thereof. In other laser systems, such as slab laser systems, the saw tooth pattern may be milled. In any event, the pitch of the saw tooth pattern on surface 22 is less than the pitch of the saw tooth pattern on surface 20. This is done so that the spaced saw tooth patterns do not create a regular variation of the inter-electrode gap 15 which could support spurious modes and degrade beam quality, but create an irregular shape to the inter-electrode gap 15.

In an illustrative embodiment, each saw tooth has approximately right angles with respect to the surface 22 and 20 thus forming discontinuities in the inter-electrode gap 15. The depth of each tooth and the spacing between teeth is chosen to discourage energy build-up in higher order modes due to diffraction or reflection of light off of surfaces 20 and 22, but not to impede gain in a desired mode of the laser cavity. For example, the depth and spacing of the threads on surface 22 may be approximately 0.7 millimeters while the depth and spacing of the saw teeth on surface 20 may be approximately 0.48 millimeters. Additionally, the ratio of the spacing between teeth (e.g., 0.7 to 0.48) is not an integer so as to discourage repeating patterns along the laser tube. Finally, modes other than the fundamental mode could be generated in the laser of the present invention by shaping the surfaces 20 and 22 to conform to the shape of such modes.

Advantageously, a laser constructed in accordance with the teachings herein has been found to provide a highly efficient diffusion cooled gas discharge laser with a minimization of spurious modes and eliminates higher order modes.

Other Embodiments

Having now described one or more preferred embodiments of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, equivalents or similar purpose, unless expressly stated otherwise. Therefore, numerous other embodiments of the modifications thereof are contemplated as falling within the scope of the present invention as defined by the appended claims and equivalents thereto.

What is claimed is:

1. A gas laser comprising:
   (a) a pair of opposed electrodes comprising an inner and an outer electrode, defining a discharge volume with an inter-electrode gap, each of the pairs of opposed electrodes having a series of saw teeth in a pattern, the inter-electrode gap having first and second opposed ends, the inter-electrode gap having a first dimension at the first end, a second dimension at the second end, and a third dimension at a point between the first end and the second end, the third dimension being less than the first and second dimensions and wherein the gap conforms to a desired mode of the laser between the first end and the second end; and
   (b) a pair of mirrors, each of the mirrors mounted adjacent to one of the ends for directing light generated in the inter-electrode gap through the discharge volume,
   wherein the pattern of saw teeth has a depth and a spacing adapted not to impede gain in the desired mode of the laser but to discourage energy build-up in modes of higher order than the desired mode.

2. The gas laser of claim 1, in which each of the patterns have a different pitch.

3. The gas laser of claim 2, wherein a ratio of the different pitches is not an integer.

4. The gas laser of claim 1, wherein the first dimension and second dimensions are the same.

5. A gas laser comprising:
   (a) a cylindrical inner electrode having an outer threaded surface;
   (b) a hollow, cylindrical outer electrode having an inner threaded surface spaced apart from and facing the outer threaded surface of the inner electrode, thereby defining a discharge volume between the inner electrode and the outer electrode with an annular, inter-electrode gap having a first end and a second end, a first radial dimension at the first end, a second radial dimension at the second end, and a third radial dimension between the first end and second end that is less than the first and second radial dimensions; and wherein the gap conforms to a desired mode of the laser between the first end and the second end; and
   (c) a pair of mirrors, each of the mirrors mounted adjacent to one of the ends for directing light generated in the inter-electrode gap through the discharge volume,
   wherein the pattern of saw teeth has a depth and a spacing adapted not to impede gain in the desired mode of the laser but to discourage energy build-up in modes of higher order than the desired mode.

6. The gas laser of claim 5, wherein a first pitch of outer threaded surface is different from a second pitch of the inner threaded surface.

7. The gas laser of claim 6, wherein a ratio of the first pitch to the second pitch is not an integer.

8. The gas laser of claim 5 wherein the first and second dimensions are the same.

9. The gas laser of claim 5, wherein the threads of the inner surface are of opposite handedness as the threads of the outer surface.

* * * * *